(12) United States Patent
Hwang et al.

(10) Patent No.: US 8,975,207 B2
(45) Date of Patent: Mar. 10, 2015

(54) METHOD FOR MANUFACTURING ADSORPTIVE BALL FOR RECOVERING PRECIOUS METALS AND FLOW THROUGH-CONTINUOUS DEIONIZATION (FT-CDI) APPARATUS USING THE SAME

(71) Applicants: The Industry & Academic Cooperation in Chungnam National University, Daejeon (KR); Pusan National University Industry-University Cooperation Foundation, Pusan (KR)

(72) Inventors: Teak Sung Hwang, Daejeon (KR); Won Ho Jung, Daejeon (KR); Noh-Seok Kwak, Daejeon (KR); Sung-gyu Park, Daejeon (KR); Jin Sun Koo, Daejeon (KR); Hui-Man Park, Daejeon (KR); Chi Won Hwang, Daejeon (KR); Chang-Sik Ha, Busan (KR)

(73) Assignees: The Industry & Academic Cooperation in Chungnam National University, Daejeon (KR); Pusan National University Industry-University Cooperation Foundation, Pusan (KR)

( * ) Notice: Subject to any disclaimer, the term of this patent is extended or adjusted under 35 U.S.C. 154(b) by 63 days.

(21) Appl. No.: 13/651,772

(22) Filed: Oct. 15, 2012

(65) Prior Publication Data
US 2013/0277220 A1    Oct. 24, 2013

(30) Foreign Application Priority Data

Dec. 28, 2011 (KR) .......................... 10-2011-0145090

(51) Int. Cl.
| | | |
|---|---|---|
| B01J 20/26 | (2006.01) |
| C22B 3/42 | (2006.01) |
| B01D 59/30 | (2006.01) |
| B01D 63/08 | (2006.01) |
| B01J 20/04 | (2006.01) |
| B01J 20/06 | (2006.01) |
| B01J 20/30 | (2006.01) |
| B01J 20/28 | (2006.01) |
| B01D 61/48 | (2006.01) |
| B01D 61/50 | (2006.01) |
| C02F 1/28 | (2006.01) |
| C02F 1/469 | (2006.01) |
| C02F 1/461 | (2006.01) |
| C02F 101/20 | (2006.01) |
| C02F 103/08 | (2006.01) |

(52) U.S. Cl.
CPC . *C22B 3/42* (2013.01); *B01D 59/30* (2013.01); *B01D 63/08* (2013.01); *B01D 63/082* (2013.01); *B01J 20/041* (2013.01); *B01J 20/06* (2013.01); *B01J 20/3078* (2013.01); *B01J 20/3085* (2013.01); *B01J 20/28019* (2013.01); *B01D 61/48* (2013.01); *B01D 61/50* (2013.01); *C02F 1/288* (2013.01); *C02F 1/4691* (2013.01); *B01J 2220/46* (2013.01); *C02F 1/281* (2013.01); *C02F 1/285* (2013.01); *C02F 2001/46138* (2013.01); *C02F 2101/20* (2013.01); *C02F 2103/08* (2013.01); *C02F 2201/46115* (2013.01); *C02F 2201/4613* (2013.01); *Y10S 502/526* (2013.01)
USPC ............................ 502/402; 502/439; 502/526

(58) Field of Classification Search
USPC .................................. 502/402, 401, 526, 439
See application file for complete search history.

(56) References Cited

U.S. PATENT DOCUMENTS 4,256,676 A    3/1981   Kovach

FOREIGN PATENT DOCUMENTS

| JP | 5575959 A | 6/1980 |
| JP | 38439 A | 1/1991 |
| JP | 2008126144 A | 6/2008 |
| KR | 100939516 B1 | 2/2010 |

*Primary Examiner* — Edward Johnson
(74) *Attorney, Agent, or Firm* — The Webb Law Firm

(57) ABSTRACT

Disclosed is an adsorptive ball for recovering precious metals and resources, a method for manufacturing the adsorptive bale, a flow through-continuous deionization (FT-CDI) module capable of recovering precious metals by using the adsorptive ball, and a flow through-continuous deionization (FT-CDI) apparatus having the flow through-continuous deionization (FT-CDI) installed thereat.

3 Claims, 4 Drawing Sheets

METHOD FOR MANUFACTURING ADSORPTIVE BALL FOR RECOVERING PRECIOUS METALS AND FLOW THROUGH-CONTINUOUS DEIONIZATION (FT-CDI) APPARATUS USING THE SAME

CROSS-REFERENCE TO RELATED APPLICATIONS

This application claims priority under 35 U.S.C. §119 to Korean Patent Application No. 10-2011-0145090, filed on Dec. 28, 2011 in the Korean Intellectual Property Office, the disclosure of which is incorporated herein by reference in its entirety.

TECHNICAL FIELD

The following disclosure relates to a method for manufacturing an adsorptive ball and a flow through-continuous deionization (FT-CDI) apparatus including a flow through-continuous deionization (FT-CDI) module.

More particularly, the following disclosure relates to a method for manufacturing an adsorptive ball capable of adsorbing precious metals and precious resources from a solution containing the precious metals and precious resources and a flow through-continuous deionization (FT-CDI) apparatus using the same. The manufactured adsorptive balls are used to adsorb precious metals and precious resources present in seawater or the like, and then continuously passed through a flow through-continuous deionization (FT-CDI) module, to thereby recover the precious metals and precious resources.

BACKGROUND

About 80 kinds of metals are dissolved at low concentrations of ions in seawater accounting for approximately 70% of the earth, including uranium (4.1 billion tons), 10 strategic rare metals in Korea, including manganese (2.7 billion tons), molybdenum (14.0 billion tons), cobalt (140 million tons), tungsten (100-million 4-thousand tons), titanium (1.4 billion tons), lithium (200 billion tons), magnesium (1,840 trillion tons), indium (27.2 billion tons), rare earth metals (4.2 billion tons) and chrome (68 million tons), and vanadium (2.7 billion tons), germanium (80 million tons), bismuth (20 million tons), and the like. In particular, magnesium (1,840 trillion tons), lithium (200 billion tons), molybdenum (14.0 billion tons), and uranium (4.1 billion tons) are highly likely to be commercialized.

Accordingly, much effort to selectively separate and recover precious metal ions such as lithium and uranium in low concentration from seawater and recycle them as resources has been made.

However, in the case of recovering precious metals dissolved in seawater or the like, the precious metals are not sufficiently concentrated due to too low concentrations thereof, which may cause excessive consumption of power, and thus fail to realize a commercially useful process.

SUMMARY

An embodiment of the present invention is directed to providing a method for manufacturing an adsorptive ball capable of recovering precious metals present in seawater or the like, and a flow through-continuous deionization (FT-CDI) apparatus capable of recovering precious metals by using the same.

The present invention provides a method for manufacturing an organic-inorganic complex type adsorptive ball having a size of 1~2000 μm, capable of selectively adsorbing and separating uranium, lithium, and high-priced useful metals in high-enriched seawater.

That is, the present invention provides a method for manufacturing an adsorptive ball capable of adsorbing precious metals, which is manufactured by preparing a porous adsorptive ball where alkaline or alkaline earth metal type complex metal oxide particles containing various metal ions, including $Li_{1.33}Mn_{1.67}O_4$ or $Li_mM_xM'_yM''_zO_2$ (where, M is at least one element selected from Co, Ni, and Mn; M' is at least one element selected from Al, Cr, V, Fe, Cu, Zn, Sn, Ti, Mg, Sr, B, Ga, In, Si, and Ge; M" is at least one element selected from Mg, Ca, B, and Ga; and $0.9 \leq X < 1$, $0.001 \leq y \leq 0.5$, $0 \leq z \leq 0.5$, and $0.5 \leq m$), are dispersed, and then ion-exchanging (activating) the porous microsphere.

In addition, the present invention provides a flow through-continuous deionization (FT-CDI) apparatus, and specifically, the flow through-continuous deionization (FT-CDI) apparatus can recover precious metals by using the manufactured adsorptive ball.

First, in order to manufacture the adsorptive ball of the present invention, complex metal oxide containing metal ions needs to be introduced to a supporter. For example, the complex metal oxide may be introduced onto a polymer supporter.

In several methods of introducing the complex metal oxide containing metal ions to the polymer supporter, a polymer supporter may be used alone or a cross-linked polymer supporter may be used. In the case of using the cross-linked polymer supporter, a cross-linkage structure may be formed by introducing a cross-linking agent, and thus the complex metal oxide containing metal ions can be stably dispersed and adsorbed in a matrix of the polymer. In the case of using the polymer supporter, a microsphere having porosity is prepared by dispersing complex metal oxide in the polymer supporter and then partially firing them through appropriate heating, and then the microsphere is ion-exchanged by acid treatment using hydrochloric acid or the like, to thereby manufacture a microsphere type adsorptive ball of the present invention. Here, complete firing may cause adhesive strength among the complex metal oxide particles to be weak, and thus the long-term use thereof may be somewhat limited. However, the long-term use thereof is possible as long as the complex metal oxide particles are well linked to one another.

In the present invention, for preparing the microsphere, a general suspension-polymerization method may be employed without particular limitation. In addition any monomer that can be adopted in the general suspension-polymerization is not particularly limited as a monomer for polymerization.

Examples of the monomer of the present invention may include, but are not limited to, styrene based monomers including styrene, acryl based monomers including methyl methacrylate, acrylonitrile, vinyl chloride, and the like. Examples of the cross-linking agent of the present invention may include multi-functional (meth)acrylates, such as, divinyl benzene, trivinyl benzene, divinyl toluene, divinyl xylene, divinyl naphthalene, trivinyl naphthalene, diisoprophenyl benzene, di(meth)acrylate, tri (meth)acrylate, and the like. For example, a cross-linking agent such as pentaerythritol triacrylate, pentaerythritol tetraacrylate, or the like may be adopted, but any cross-linking agent that can be generally used in the art may be used without limitation. The cross-linking agent of the present invention may be appropriately used in 0.01~5 wt % based on the weight of the monomer. In order to prepare a spherical lithium ion adsorbent as an example of the microsphere of the present invention, styrene and divinyl benzene are purified by using NaOH, and complex metal oxide containing ions such as a lithium ion and the like, for example, $Li_{1.33}Mn_{1.67}O_4$ or the like, is inputted into a monomer mixture and sufficiently dispersed in the monomer mixture. The monomer mixture means a composition including a monomer and a cross-linking agent. The suspending agent is inputted in a general content for suspension-polymerization. For example, polyvinyl alcohol or the like may be used as the suspending agent. The monomer mixture is sufficiently stirred while the temperature is raised. When the temperature reaches the polymerization temperature, the monomer mixture is inputted into a solution containing the dispensing agent while they are intensely stirred, to thereby initiate suspension-polymerization. Here, a polymerization initiator may be inputted into the monomer mixture, and as necessary, a further organic solvent, such as, toluene, xylene, normal hexane, cyclohexane, or the like, may be inputted thereinto.

A particle type complex metal oxide, such as $Li_{1.33}Mn_{1.67}O_4$ or the like, is strongly stirred with the monomer mixture solution so that they are completely mixed, and may be further stirred by using ultrasonic waves.

The thus obtained suspension-polymer by polymerization is dried through a drying method such as spray drying, and then fired at a temperature of 200~400° C. for 1~10 hours, to thereby prepare a micro-sized microsphere. Generally, the microsphere preferably has a size of 20~1000 μm. In order to allow the prepared microsphere to adsorb precious metal ions from a medium such as seawater or the like, the microsphere is ion-exchanged by being treated with an inorganic acid solution such as a hydrochloric acid or sulfuric acid solution. That is, the microsphere is ion-exchanged by acid treatment so that the microsphere can ion-exchange with precious metals present in a medium, whereby an adsorptive ball achieved by the present invention is manufactured.

Further, the present invention is directed to a flow through-continuous deionization (FT-CDI) apparatus including a flow through-continuous deionization (FT-CDI) module. According to the present invention, precious metals can be recovered at high concentration by using the adsorptive balls adsorbing and the flow through-continuous deionization (FT-CDI) apparatus to adsorb the precious metals dissolved in seawater and then recover the precious metals.

The present invention provides a flow through-continuous deionization (FT-CDI) apparatus including a flow through-continuous deionization (FT-CDI) module, according to which the adsorptive balls are used to adsorb precious metals, and then passed through the flow through-continuous deionization (FT-CDI) module including electrodes to thereby recover the precious metals, and here, a voltage is applied to an anode and a cathode to allow the anode and the cathode to exhibit polarities, so that ionic materials adsorbed in the adsorptive balls are adsorbed on surfaces of the anode and the cathode.

In the flow through-continuous deionization (FT-CDI) module, when the adsorptive balls containing high concentration of precious metal ions, containing dissolved ions, are continuously passed between the two electrodes, cathode and anode, negative ions adsorbed in the adsorptive balls are adsorbed and concentrated on the anode and positive ions adsorbed in the adsorptive ball are adsorbed and concentrated on the cathode. When a reverse current is allowed to flow, by, for example, short-circuiting the two electrodes, the concentrated ions are desorbed from the respective electrodes, so that the precious metal ions are recovered.

FIG. 6 shows the flow through-continuous deionization (FT-CDI) module of the flow through-continuous deionization (FT-CDI) apparatus of the present invention. Detailed description thereof will be set forth below.

First, with respect to electrodes (C and K), for example, electrodes where Ti substrates are plated with Pt are used as CDI electrodes. The ion adsorptive balls manufactured in the present invention are allowed to flow through an inflow part for metal ion adsorbing beads of a bead supply unit (G), and then pass through the bead supply unit (G), to thereby separate the positive ions and the negative ions by electrodes installed at both ends. Then, the adsorptive balls passing through the bead supply unit flow out through an outflow part below while some ions are desorbed therefrom. The adsorptive balls that flowed out are allowed to pass through another neighboring FT-CDI module or repeatedly be circulated the same flow through-continuous deionization (FT-CDI) module, to thereby recover precious metal ions adsorbed therein.

For achieving this operation, ion separating membranes (E and I) are provided at both lateral surfaces of the bead supply unit (G) of the flow through-continuous deionization (FT-CDI) module. A positive ion separating membrane at a cathode side and a negative ion separating membrane at an anode side are respectively provided and combined with each other while gaskets (F and H) are intermediated between edges thereof. The separating membranes are laminated and combined with the electrodes while gaskets (D and J) are intermediated therebetween.

Then, the electrodes are coupled and combined with cases (A and M) while gaskets (B and L) are intermediated therebetween. Therefore, according to the present invention, a carrier such as seawater or the like having the adsorptive balls in which the precious metals are adsorbed is continuously passed through this flow through-continuous deionization (FT-CDI) module, so that the precious metals are precipitated onto the electrodes and recovered. In the present invention, two or more flow through-continuous deionization (FT-CDI) modules may be continuously connected to each other to constitute a flow through-continuous deionization (FT-CDI) apparatus. In the drawing, pumps and conduits for recycling fluid containing the adsorptive balls are not separately indicated.

DETAILED DESCRIPTION OF EMBODIMENTS

Example 1

Manufacture of Adsorptive Ball

In order to prepare a spherical lithium ion adsorptive ball, as shown in Table 1, styrene and divinyl benzene were dehydrated by using NaOH, and $Li_{1.33}Mn_{1.67}O_4$ (average particle size: 60 nm) as complex metal oxide having lithium ions was sufficiently dispersed therein. 0.1% by weight of polyvinyl alcohol (99% saponification degree) based on the weight of the styrene monomer was inputted into distilled water, and then stirred at a temperature of 80° C. to be sufficiently mixed with each other. 0.1% by weight of benzoyl peroxide and 10% by weight of toluene based on the weight of the monomer were mixed with the thus prepared monomer mixture solution. The particle type of $Li_{1.33}Mn_{1.67}O_4$ was subjected to strong stirring so that it can be completely mixed with the monomer mixture solution, and then further dispersed for 30 minutes by using ultrasonic waves. The solution where $Li_{1.33}Mn_{1.67}O_4$ added was mixed with styrene and divinyl benzene was slowly dropped into a distilled water solution while being strongly stirred, to thereby allow suspension-polymerization to proceed.

Conditions for the suspension-polymerization in order to prepare the spherical lithium ion adsorptive ball were tabulated in Table 1. In order to perform allow smooth polymerization, the reaction was allowed to proceed for 6 hours while the temperature was maintained at 80° C. The obtained compound was slowly dried in an oven at 80° C. for 12 hours. The dried compound was fired in an electric furnace at a temperature of 300° C. for 2 hours to completely remove unreacted materials and moisture therefrom.

TABLE 1

| Example | SM Weight (g) | SM Weight ratio | DVB Weight (g) | DVB Weight ratio | $Li_{1.33}Mn_{1.67}O_4$ (g) | Toluene (g) | BPO (g) | PVA (g) | D.I water (g) | Temp (° C.) | Time (hr) |
|---|---|---|---|---|---|---|---|---|---|---|---|
| 1 | 5 | 1 | 15.0 | 3 | 1.0, 2.0, 3.0 | 2.0 | 0.02 | 0.02 | 250 | 80 | 6 |

Then, the thus prepared microsphere shaped adsorptive ball was completely fired in the conditions of Table 2 below, to thereby manufacture the fired adsorptive balls.

TABLE 2

| Code | Content of Adsorptive ball (g) | Temp (° C.) | Atmosphere | Time (hr) |
|---|---|---|---|---|
| Example 1 | 1.0 | 300 | $N_2$ | 120 |

Figure 1:
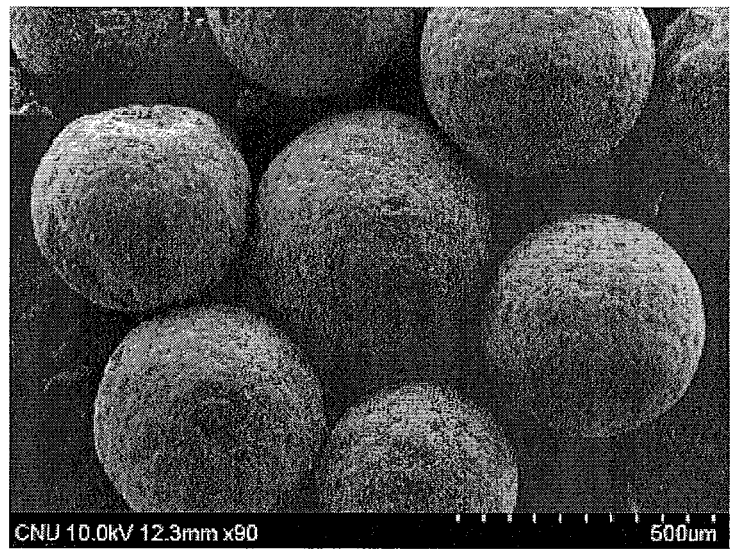
FIG. 1 is an electron microscope image of adsorptive balls according to Example 1 of the present invention.

A surface structure of the thus obtained spherical adsorptive ball was observed by a cold type field emission scanning electron microscope, and an image thereof is shown in FIG. 1. As shown in FIG. 1, the final product obtained in Example 1 has a sphere shape having a size of 400 μm, and thus a large surface area. Accordingly, it can be confirmed that an adsorptive ball having adsorption efficiency, which is not worse than a powder adsorbent, was manufactured.

Figure 2:
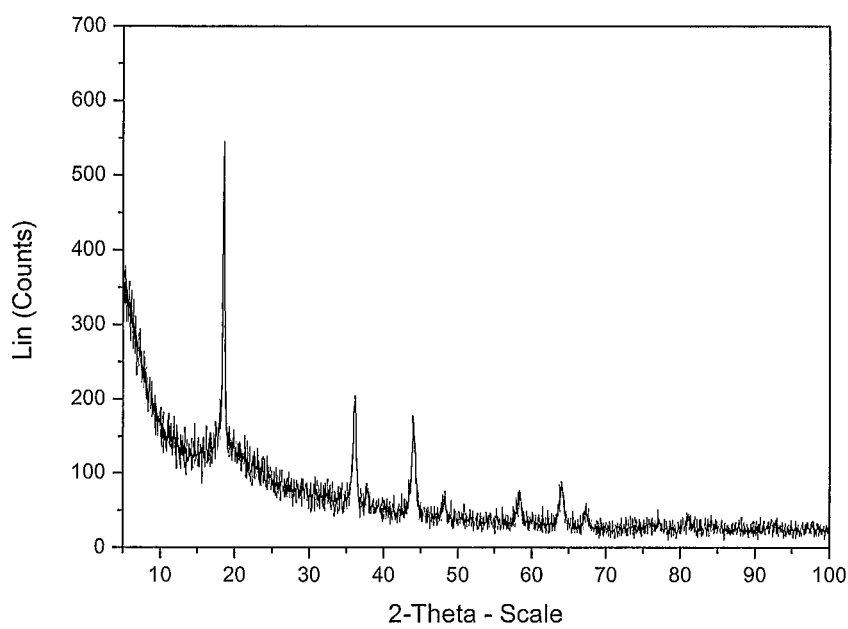
FIG. 2 is an X-ray diffraction pattern analysis graph of the adsorptive ball according to Example 1.

A crystalline structure of the thus obtained spherical adsorptive ball was measured by a multipurpose X-ray diffractometer. The X-ray diffraction pattern analysis was conducted in a range of 2θ of 10~90 degrees, and the results thereof are shown in FIG. 2. As the X-ray diffraction pattern analysis results of the crystal structure of the thus obtained spherical lithium ion adsorptive ball, a spinel crystal structure diffraction pattern was shown in FIG. 2.

Activation of Spherical Adsorptive Ball (Ion-Exchange)

Next, the spherical adsorptive balls obtained as above were acid-treated to be activated. The acid treatment was performed for 24 hours while the adsorptive balls were stirred in 500 ml of 0.1 M HCl solution at a rate of 100 rpm. The spherical adsorbent activated once was dried in an oven at 60° C. for 4 hours, and then secondarily activated for 24 hours while being stirred in 500 ml of 0.1 M HCl solution at the same rate as the first activation. The spherical adsorbent activated twice was dried in an oven at 60° C. for 4 hours, as before, and then was thirdly activated by using 500 ml of 0.1 M HCl solution. Therefore, the spherical adsorbent was activated through three times of lithium ion adsorption and desorption procedures.

Evaluation on Adsorptive Ability of Activated Spherical Adsorptive Ball

In order to confirm adsorptive ability of the thus manufactured activated spherical adsorptive ball, adsorption efficiency of the thus manufacture spherical lithium ion adsorptive ball was measured.

Figure 3:
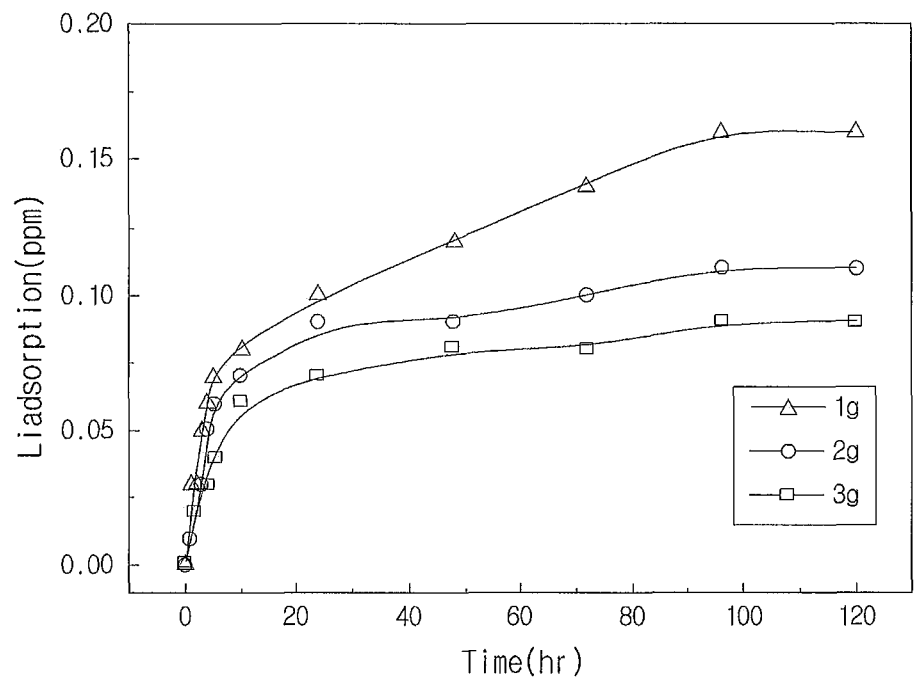
FIG. 3 is a graph showing lithium ion adsorption according to Example 1.

In order to measure the lithium adsorptive ability, 0.2 ppm of a lithium single solution was prepared by dissolving 1.234 mg of LiCl in 1 L of distilled water. The lithium adsorption was allowed to proceed for 120 hours while the ion adsorptive balls manufactured by using different amounts of lithium adsorbents (1 g, 2 g, and 3 g) were respectively stirred in 100 ml of the thus prepared lithium single solution at a rate of 100 rpm. In order to measure lithium adsorptive ability, aliquots of the sample were taken after 0 hour, 1 hour, 2 hour, 3 hour, 4 hour, 5 hour, 10 hour, 24 hour, 48 hour, 72 hour, 96 hour, and 120 hour, and then the amount of lithium adsorbed was obtained through ICP analysis for each of the aliquots. The results of measuring the lithium adsorption in the lithium single solution (Li 0.2 ppm) are shown in FIG. 3. As shown in FIG. 3, it can be confirmed that the lithium ion absorptive ball containing more amount of lithium adsorbent had higher lithium adsorptive ability. It can be confirmed that, in particular, the spherical lithium ion adsorptive ball manufactured by adding 3 g of lithium adsorbent had an adsorption of up to 0.16 ppm per 1 g.

Example 2

The lithium adsorption was measured in artificial seawater (Li 2.0 ppm, In $1\times10^{-1}$ ppm, Co $3\times10^{-1}$ ppm, Na $1.1\times10^7$ ppm, Mg $1.3\times10^6$ ppm, Ca $4.2\times10^5$ ppm) by using the activated spherical adsorptive ball manufactured in Example 1. The artificial seawater for measuring lithium adsorptive ability was prepared by dissolving 3.64 g of marine reef salt in 1 L of distilled water. 1 g of the lithium ion adsorptive ball was inputted into 100 ml of the prepared artificial seawater, and then lithium adsorption was allowed to proceed for 120 hours while stirring was performed at a rate of 100 rpm.

Figure 4:
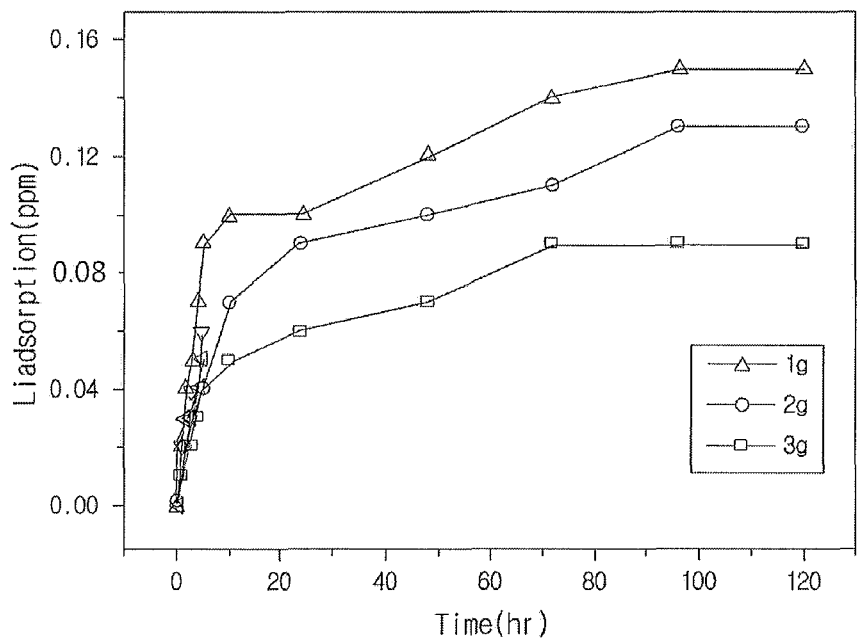
FIG. 4 is a graph showing lithium ion adsorption according to Example 2.

In order to measure lithium adsorptive ability, aliquots of the sample were taken after 0 hour, 1 hour, 2 hours, 3 hours, 4 hours, 5 hours, 10 hours, 24 hours, 48 hours, 72 hours, 96 hours, and 120 hours, and then the amount of lithium adsorbed was obtained through ICP analysis for each of the aliquots. The results of measuring the lithium adsorption in the artificial seawater (Li 0.2 ppm) are shown in FIG. 4. As shown in FIG. 4, it can be confirmed that the lithium ion absorptive ball containing more amount of lithium adsorbent had stronger lithium adsorptive ability. It was confirmed that the spherical lithium ion adsorptive ball manufactured by adding 3 g of lithium adsorptive ball had the highest adsorptive ability, like the adsorptive ability in the lithium single solution. It can be confirmed that the spherical lithium ion adsorptive ball manufactured by adding 3 g of lithium adsorbent had an adsorption of up to 0.15 ppm per 1 g.

Example 3

Figure 5:
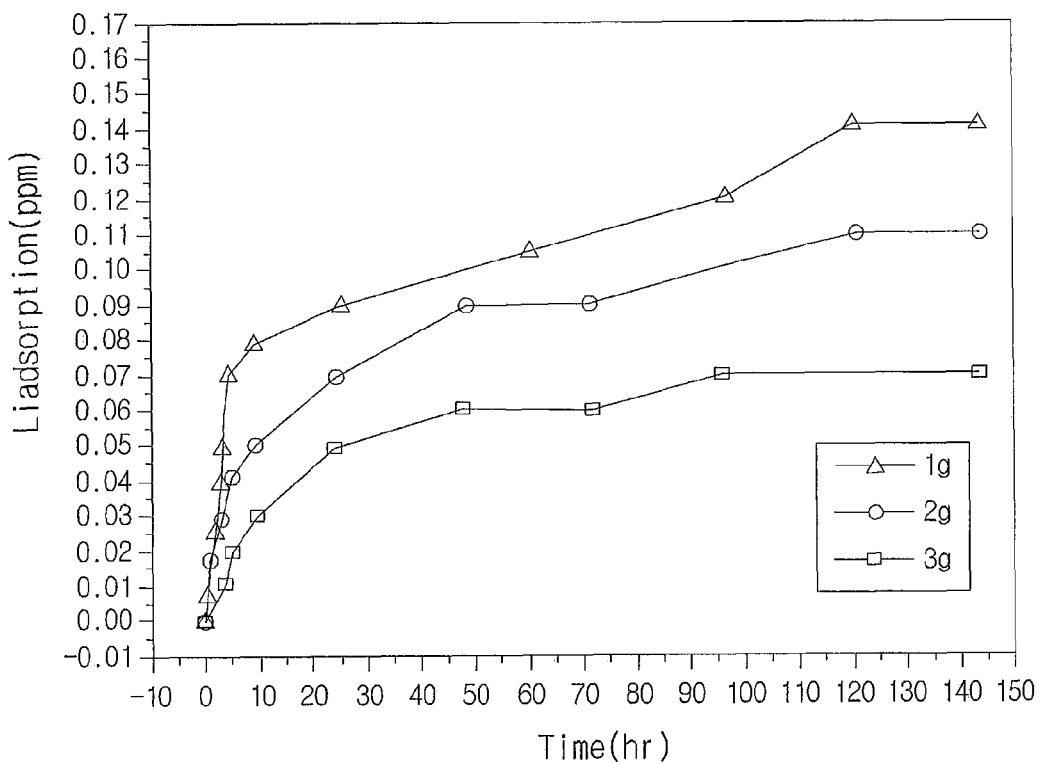
FIG. 5 is a graph showing lithium ion recovery according to Example 1.
Figure 6:
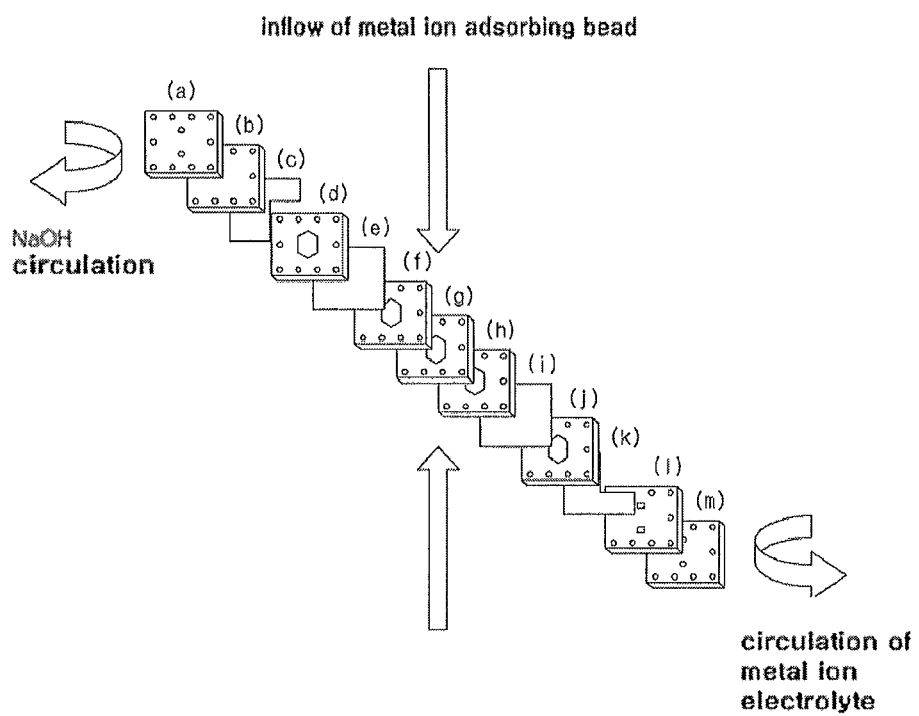
FIG. 6 shows a flow through-continuous deionization (FT-CDI) module of the present invention.

Recovery of Lithium Ion Using Flow Through-Continuous Deionization (FT-CDI) Apparatus Adopting Adsorptive Ball The activated spherical adsorptive ball manufactured in Example 1, in which lithium ions are adsorbed, was subjected to desorption by using a flow through-continuous deionization (FT-CDI) apparatus, and the results are shown in FIG. 5. In order to confirm desorption ability of the spherical lithium ion adsorptive ball, an adsorbent through continuous deionization apparatus including a flow through-continuous deionization (FT-CDI) module of FIG. 6 having electrodes where Pt is plated on Ti substrates was used. The desorption amount was measured in 2 L of artificial seawater (Li 2.0 ppm, In $1 \times 10^{-1}$ ppm, Co $3 \times 10^{-1}$ ppm, Na $110.1 \times 10^{7}$ ppm, Mg $1.3 \times 10^{6}$ ppm, Ca $4.2 \times 10^{5}$ ppm) by using 20 g of an adsorbent in the process variables of flow rate of 40 ml/min, a voltage of 5.0 V and three days. As shown in FIG. 5, the desorption ability of the spherical lithium ion adsorbent was 0.14 ppm of lithium per 1 g in the artificial seawater having a lithium concentration of 0.2 ppm and exhibited 90% or higher of lithium recovery.

As can be confirmed from the results of measuring the adsorptive ability of the spherical lithium ion adsorptive ball obtained in the above example, the spherical lithium ion adsorptive ball according to the present invention has high adsorptive ability and a spherical bead shape, resulting in easy management, and thus can be applied to several adsorbing systems which can be used as an effective material for lithium recovery.

The existing CDI apparatus cannot concentrate and recover precious metals contained in a medium such as seawater or the like at high concentrations. However, according to the present invention, the precious metals are adsorbed in the adsorptive balls by exposing the adsorptive balls for recovering precious metals to seawater for a long time or artificially circulating the seawater, and the resultant adsorptive balls are collected and then continuously passed through the flow through-continuous deionization (FT-CDI) module, so that high concentration of precious metal ions can be recovered at a low cost.

Although embodiments of the present invention have been described with reference to the accompanying drawings, it can be appreciated by those skilled in the art that modified embodiments of the present invention can be made without departing from the technical sprit and necessary features of the invention. Accordingly, embodiments and drawings described herein are provided by way of examples only and should not be construed as being limited.

What is claimed is:
1. A method for manufacturing a microsphere, the method comprising:
  dispersing complex metal oxide particles in a monomer mixture, followed by polymerizing, to thereby prepare a microsphere and the fired microsphere;
  ion-exchanging the fired microsphere with an inorganic acid solution; and
  drying the ion-exchanged microsphere.
2. The method of claim 1, wherein the complex metal oxide particle contains a lithium ion.
3. The method of claim 1, wherein the firing is performed at a firing temperature of 200~500° C.

* * * * *